United States Patent
Lee et al.

(10) Patent No.: US 8,722,224 B2
(45) Date of Patent: May 13, 2014

(54) MIDDLE OR LARGE-SIZED BATTERY PACK OF IMPROVED COOLING EFFICIENCY

(75) Inventors: BumHyun Lee, Seoul (KR); MinJung Kim, Suwon-si (KR); Jin Kyu Lee, Busan (KR); HeeSoo Yoon, Daejeon (KR); DalMo Kang, Daejeon (KR); Jong Moon Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 2 days.

(21) Appl. No.: 13/339,803

(22) Filed: Dec. 29, 2011

(65) Prior Publication Data
US 2012/0171532 A1 Jul. 5, 2012

Related U.S. Application Data (63) Continuation of application No. PCT/KR2011/000057, filed on Jan. 6, 2011.

(30) Foreign Application Priority Data

Jan. 6, 2010 (KR) ........................ 10-2010-0000809

(51) Int. Cl.
*H01M 10/50* (2006.01)
*H01M 2/10* (2006.01)
*H01M 2/36* (2006.01)

(52) U.S. Cl.
USPC ........................................................ 429/72

(58) Field of Classification Search
USPC ........................................................ 429/72
See application file for complete search history.

(56) References Cited

U.S. PATENT DOCUMENTS 6,255,015 B1 * 7/2001 Corrigan et al. .............. 429/149
2009/0253026 A1 10/2009 Gaben

FOREIGN PATENT DOCUMENTS

| JP | 2009-9889 A | 1/2009 | |
| JP | 2009009889 A * | 1/2009 | ............ H01M 10/50 |
| JP | 2009-147187 A | 7/2009 | |
| KR | 1999-0023446 U | 7/1999 | |
| KR | 10-2009-0107443 A | 10/2009 | |
| WO | WO 2007/115743 A2 | 10/2007 | |

OTHER PUBLICATIONS

International Search Report issued in PCT/KR2011/000057, dated Sep. 30, 2011.

* cited by examiner

*Primary Examiner* — Karie O'Neill Apicella
(74) *Attorney, Agent, or Firm* — Birch, Stewart, Kolasch & Birch, LLP (57) ABSTRACT

Disclosed is a battery pack configured to have a structure in which two or more battery modules, each including a plurality of battery cells or unit modules (unit cells) which can be charged and discharged, are mounted in a space defined between a pack case and a base plate, wherein cooling members, each including a heat dissipation fin disposed in contact with outsides of corresponding ones of the unit cells and a coolant conduit connected to a lower end of the heat dissipation fin to allow a coolant to flow therealong, are mounted at interfaces between the unit cells, the base plate, located below the battery modules, is configured to form a coolant flow channel having a coolant flow direction corresponding to the coolant flow direction in the coolant conduit, the pack case is coupled to the base plate in a state in which the battery modules are mounted on the base plate.

19 Claims, 4 Drawing Sheets

MIDDLE OR LARGE-SIZED BATTERY PACK OF IMPROVED COOLING EFFICIENCY

CROSS REFERENCE TO RELATED APPLICATIONS

This application is a Continuation of PCT International Application No. PCT/KR2011/000057 filed on Jan. 6, 2011, which claims priority under 35 U.S.C. §119(a) to Patent Application No. 10-2010-0000809 filed in the Republic of Korea on Jan. 6, 2010, all of which are hereby expressly incorporated by reference into the present application.

FIELD OF THE INVENTION

The present invention relates to a middle or large-sized battery pack with improved cooling efficiency, and, more particularly, to a middle or large-sized battery pack configured to have a structure in which two or more battery modules, each including a plurality of battery cells or unit modules (unit cells) which can be charged and discharged, are mounted in a space defined between a pack case and a base plate, wherein cooling members, each including a heat dissipation fin disposed in contact with outsides of corresponding ones of the unit cells and a coolant conduit connected to a lower end of the heat dissipation fin to allow a coolant to flow therealong, are mounted at interfaces between the unit cells, the base plate, located below the battery modules, is configured to form a coolant flow channel having a coolant flow direction corresponding to the coolant flow direction in the coolant conduit, and the pack case is coupled to the base plate in a state in which the battery modules are mounted on the base plate.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to one another because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell (unit cell) of the middle or large-sized battery module. In particular, much interest is currently focused on the pouch-shaped battery, which uses an aluminum laminate sheet as a sheathing member, because the pouch-shaped battery is lightweight, the manufacturing costs of the pouch-shaped battery are low, and it is easy to modify the shape of the pouch-shaped battery.

Battery cells constituting such a middle or large-sized battery module are secondary batteries which can be charged and discharged. Consequently, a large amount of heat is generated from the high-power, large-capacity secondary batteries during the charge and discharge of the batteries. In particular, the laminate sheet of each pouch-shaped battery widely used in the battery module has a polymer material exhibiting low thermal conductivity coated on the surface thereof with the result that it is difficult to effectively lower the overall temperature of the battery cells.

If the heat, generated from the battery module during the charge and discharge of the battery module, is not effectively removed from the battery module, the heat accumulates in the battery module with the result that deterioration of the battery module is accelerated. According to circumstances, the battery module may catch fire or explode. For this reason, a cooling system is needed in a middle or large-sized battery pack for vehicles, which is a high-power, large-capacity battery including a plurality of middle or large-sized battery modules, to cool battery cells mounted in the battery pack.

Each battery module mounted in a middle or large-sized battery pack is generally manufactured by stacking a plurality of battery cells with high integration. In this case, the battery cells are stacked in a state in which the battery cells are arranged at predetermined intervals so that heat generated during the charge and discharge of the battery cells is removed. For example, the battery cells may be sequentially stacked in a state in which the battery cells are arranged at predetermined intervals without using an additional member. Alternatively, in a case in which the battery cells have low mechanical strength, one or more battery cells are mounted in a battery cartridge, and a plurality of battery cartridges is stacked to constitute a battery module. Coolant channels may be defined between the stacked battery cells or between the stacked battery modules so that heat accumulating between the stacked battery cells or between the stacked battery modules is effectively removed.

In this structure, however, it is necessary to provide a plurality of coolant channels corresponding to the number of the battery cells with the result that the overall size of the battery pack is increased.

In particular, in a case in which the cooling structure is based on a water cooling type cooling system, a plurality of coolant channels is defined between the battery cells or between the battery modules with the result that it is very difficult to design the cooling structure. In addition, if a cooling member is mounted to a specific region of the batter pack to constitute the cooling structure, overall size of the battery pack is increased.

Also, in a case in which the cooling structure is based on an air cooling type cooling system, intervals of the coolant channels are relatively narrowed, when a plurality of battery cells or battery modules is stacked, in consideration of the size of the battery pack. As a result, design of the cooling structure is complicated. That is, high pressure loss is caused by the coolant channels arranged at intervals narrower than a coolant inlet port with the result that it is difficult to design shapes and positions of the coolant inlet port and a coolant outlet port. Also, a fan may be further provided to prevent such pressure loss, and therefore, design may be restricted due to power consumption, fan noise, space or the like.

Furthermore, in a case in which the cooling structure is based on an air cooling type cooling system, coolant channels are provided at the upper and lower parts of the battery pack to constitute a coolant introduction part and a coolant discharge part so that a coolant is introduced from the coolant introduction part to cool the respective battery modules and is then discharged to the coolant discharge part with the result that overall size of the battery pack is increased.

Consequently, there is a high necessity for a battery pack which provides high-power, large-capacity electricity, which can be manufactured in a simple and compact structure, and which exhibits excellent cooling efficiency and safety.

DISCLOSURE

Technical Problem

Therefore, the present invention has been made to solve the above problems, and other technical problems that have yet to be resolved.

Specifically, it is an object of the present invention to provide a middle or large-sized battery pack configured to have a structure in which coolant conduits formed in a shape to maximize the contact area between the coolant conduits and a coolant are integrally formed at the lower parts of cooling fins, and therefore, the cooling efficiency of the battery pack is maximized.

Also, it is another object of the present invention to provide a middle or large-sized battery pack configured to have a structure in which a coolant channel is located at a specific region of the battery pack, and therefore, the increase in overall size of the battery pack is restrained.

Technical Solution

In accordance with one aspect of the present invention, the above and other objects can be accomplished by the provision of a middle or large-sized battery pack configured to have a structure in which two or more battery modules, each including a plurality of battery cells or unit modules (unit cells) which can be charged and discharged, are mounted in a space defined between a pack case and a base plate, wherein cooling members, each including a heat dissipation fin disposed in contact with outsides of corresponding ones of the unit cells and a coolant conduit connected to a lower end of the heat dissipation fin to allow a coolant to flow therealong, are mounted at interfaces between the unit cells, the base plate, located below the battery modules, is configured to form a coolant flow channel having a coolant flow direction corresponding to the coolant flow direction in the coolant conduit, the pack case is coupled to the base plate in a state in which the battery modules are mounted on the base plate, and a coolant to remove heat generated from the unit modules is introduced from one side of the coolant flow channel of the base plate, flows through the coolant conduits of the respective cooling members, and is then discharged to the other side of the coolant flow channel of the base plate.

The middle or large-sized battery pack is configured so that a coolant is introduced from one side of the pack case, flows through the coolant conduits of the cooling members disposed between the unit cells, and is then discharged to the other side of the pack case. Consequently, the coolant flow via the heat dissipation fins mounted at the interfaces between the unit cells in the battery pack to cool the respective battery cells, thereby exhibiting high cooling efficiency without an additional heat conduction member.

Also, since the coolant channel is provided only below the battery modules, it is possible to manufacture a middle or large-sized battery pack having a more compact structure than a battery pack to which a conventional cooling system in which coolant flow channels are provided above and below the battery modules is applied.

Furthermore, the middle or large-sized battery pack according to the present invention is configured so that the coolant conduit of each of the cooling member is located at the lower end of the corresponding heat dissipation fin. Even when a leakage of water occurs, therefore, it is possible to minimize damage to the battery cell due to moisture. Consequently, the middle or large-sized battery pack according to the present invention can be applied to a water cooling type cooling system as well as an air cooling type cooling system.

Preferably, each of the battery cells is a plate-shaped battery cell, which has a small thickness and a relatively large width and length so that the total size of the battery module is minimized when the battery cells are stacked to constitute the battery module. A preferred example of such a plate-shaped battery cell may be a secondary battery configured to have a structure in which an electrode assembly of a cathode/separator/anode structure is mounted in a battery receiving part, and a pouch-shaped battery case including resin layer and a metal layer is sealed by thermal welding so that a sealing portion is formed at the edge of the battery case. A secondary battery configured to have the above structure may also be referred to as a 'pouch-shaped battery cell.'

Meanwhile, each of the unit modules may be configured to have various structures. For example, each of the unit modules may be configured to have a structure in which plate-shaped battery cells, each having electrode terminals formed at the upper end and the lower end thereof, are connected in series to each other. Each of the unit modules may include two or more battery cells, electrode terminals of which are connected in series to each other, and cell covers coupled to each other to cover the outsides of the battery cells without the electrode terminals.

Each of the cooling members may have a heat dissipation fin and a coolant conduit configured to have a specific structure as previously defined. Preferably, each of the cooling members is configured to have a structure in which the coolant conduit is integrally formed at the heat dissipation fin.

As described above, the coolant conduit, through which the coolant flows, is integrally formed at the heat dissipation fin. Consequently, it is possible to fundamentally prevent the occurrence of thermal conduction resistance between the heat dissipation fin and the coolant conduit and thus to more effectively cool the battery modules.

In a preferred example, the coolant conduit of each of the cooling members may be configured to have a hollow structure, such as a polygonal hollow structure, an elliptical hollow structure or a circular hollow structure in vertical section, through which the coolant flows.

As an example of the above structure, the coolant conduit of each of the cooling members may be configured to have a quadrangular hollow structure through which the coolant flows. Consequently, the spaces in which the coolant conduits can be located are maximally utilized between the unit cells disposed in contact with each other in a state in which the heat dissipation fins are interposed between the respective unit cells, thereby maximizing the contact area between the coolant conduits and the coolant.

As another example, the coolant conduit of each of the cooling members may have two or more protrusions formed at the inside of the hollow structure in the flow direction of the coolant so as to maximize the contact area between the coolant conduit and the coolant. It is possible to exhibit higher cooling efficiency by the provision of such protrusions.

In the above structure, the size of each of the protrusions is not particularly restricted so long as the protrusions do not disturb the flow of the coolant. For example, the size of each of the protrusions may be 20% to 90% of the hollow width of the coolant conduit.

Specifically, if the size of each of the protrusions may be less than 20% of the hollow width of the coolant conduit, it is difficult to maximize the contact area between the coolant conduit and the coolant, which is not preferable. On the other hand, if the size of each of the protrusions may be greater than 90% of the hollow width of the coolant conduit, the protrusions disturb the flow of the coolant, which is not preferable.

According to circumstances, the coolant conduit of each of the cooling members may be formed by bending a plate-shaped member to have a hollow structure in vertical section, and a bent end of the coolant conduit may be coupled to the heat dissipation fin. In this structure, the bent end of the coolant conduit and the heat dissipation fin may be coupled to each other using various coupling methods. For example, the bent end of the coolant conduit and the heat dissipation fin may be coupled to each other by welding, whereby the coupling between the coolant conduit and the heat dissipation fin is more securely achieved.

The material for each of the cooling members is not particularly restricted so long as each of the cooling members is formed of a material exhibiting high thermal conductivity to improve cooling efficiency. For example, each of the cooling members may be formed of a metal material exhibiting high thermal conductivity.

Meanwhile, the base plate, disposed below the battery modules, is generally formed, for example, in a U shape and is provided at opposite ends thereof with upward protrusions. When a middle or large-sized battery pack is constituted by a plurality of battery modules, therefore, the structural stability of the battery pack is greatly improved.

As an example of the above structure, the height of each of the upper protrusions may be equal to that of the coolant conduit of each of the cooling members so that the coolant conduit can be stably mounted to the base plate. Specifically, if the height of each of the upper protrusions is less than that of the coolant conduit of each of the cooling members, the side of the coolant conduit is partially exposed to the outside with the result that the outermost battery modules come into contact with the upward protrusions, whereby the volume of the battery pack is increased, which is not preferable. On the other hand, the height of each of the upper protrusions is greater than that of the coolant conduit of each of the cooling members, the space defined by the base plate is not maximally utilized with the result that cooling efficiency is lowered, which is not preferable.

In the above structure, the coolant flow channel is formed in a space defined by the upper protrusions of the base plate and the bottoms of the respective unit cells.

Since the coolant flow channel having a coolant flow direction corresponding to the coolant flow direction in each of the coolant conduits is formed by simply placing the unit cells above the base plate, the introduction of a coolant is achieved more efficiently, and therefore, it is possible to manufacture a battery pack having a structure with higher safety.

Meanwhile, the coolant is not particularly restricted so long as the coolant exhibits high cooling efficiency while easily flowing in the coolant conduit. For example, the coolant may be air or water. Preferably, the coolant is water since water contains high latent heat, thereby maximizing cooling efficiency.

The middle or large-sized battery pack includes a plurality of battery modules in order to provide high power output and large capacity. Consequently, the battery pack is preferably used as a power source for electric vehicles, hybrid electric vehicles, or plug-in hybrid electric vehicles in which high-temperature heat generated during the charge and discharge of the battery modules is a serious safety concern.

In particular, the battery pack is more preferably used as a power source for the electric vehicles and plug-in hybrid electric vehicles, which require high power output and heat dissipation from the battery pack for a long period of time.

In accordance with another aspect of the present invention, there is provided a battery module including a plurality of battery cells mounted in a module case so that the battery cells are arranged adjacent to each other in a lateral direction.

Specifically, the battery module may be configured to have a structure in which a cooling member is mounted at least one interface between the battery cells, and the cooling member comprises a heat dissipation fin disposed in contact with outsides of corresponding ones of the battery cells and a coolant conduit integrally formed at one end of the heat dissipation fin to allow a coolant to flow therealong.

Consequently, the coolant, flowing in the coolant conduit, passes through the heat dissipation fin integrally formed at one end of the coolant conduit to effectively cool the respective battery cells without heat loss.

In the above structure, the coolant conduit may be formed at the upper part or the lower part of the battery module. Consequently, it is possible to minimize the overall volume of the battery module, and therefore, it is possible to manufacture a battery module that is capable of exhibiting high cooling efficiency while having a compact structure.

According to circumstances, a connector may be mounted to the outside of the battery module so that a cable to control the operation of the battery module is connected to the battery module via the connector so as to improve safety of the battery module.

In accordance with a further aspect of the present invention, there is provided a cooling member mounted at an interface between battery cells in a contact fashion.

Specifically, the cooling member may include a heat dissipation fin disposed in contact with the outsides of the battery cells and a coolant conduit connected to one end of the heat dissipation fin, the coolant conduit having a hollow structure through which a coolant flows, the coolant conduit may be configured to have a hollow structure, such as a polygonal hollow structure, an elliptical hollow structure or a circular hollow structure in vertical section, through which the coolant flows, and the coolant conduit may have two or more protrusions formed at an inside of the hollow structure in the flow direction of the coolant so as to maximize the contact area between the coolant conduit and the coolant.

Since the cooling member has the above specific structure, which is a novel structure, it is possible to greatly improve cooling efficiency of the battery cells by the provision of the protrusions of the coolant conduit and the heat dissipation fin. Consequently, the cooling member can be used as a part to constitute a battery module or a battery pack having a more compact structure, which is preferable.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
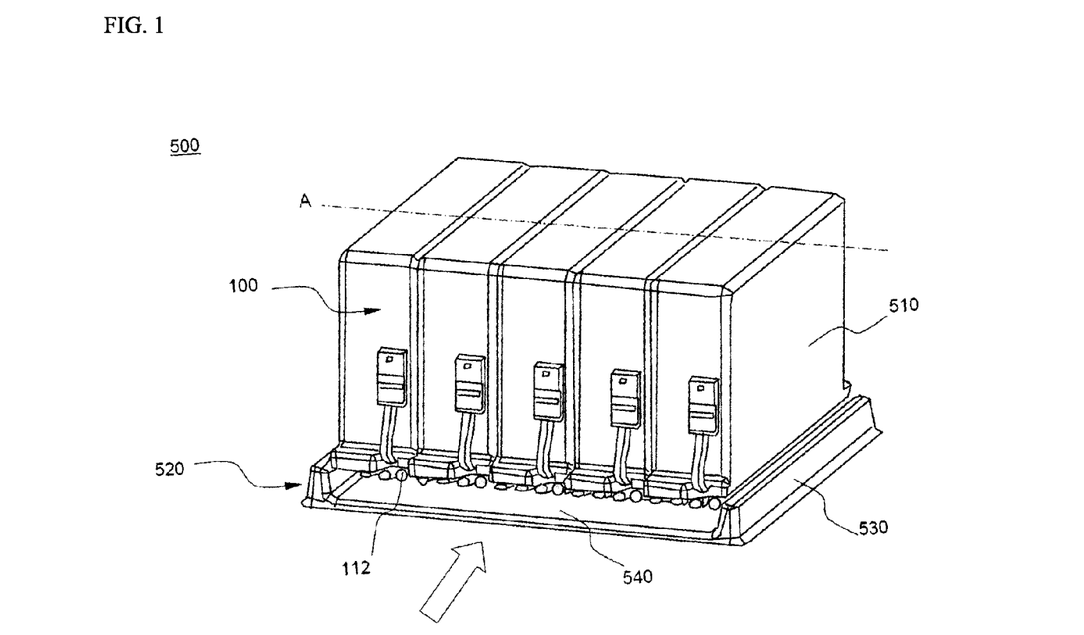
FIG. 1 is a perspective view illustrating a middle or large-sized battery pack according to an embodiment of the present invention.
Figure 2:
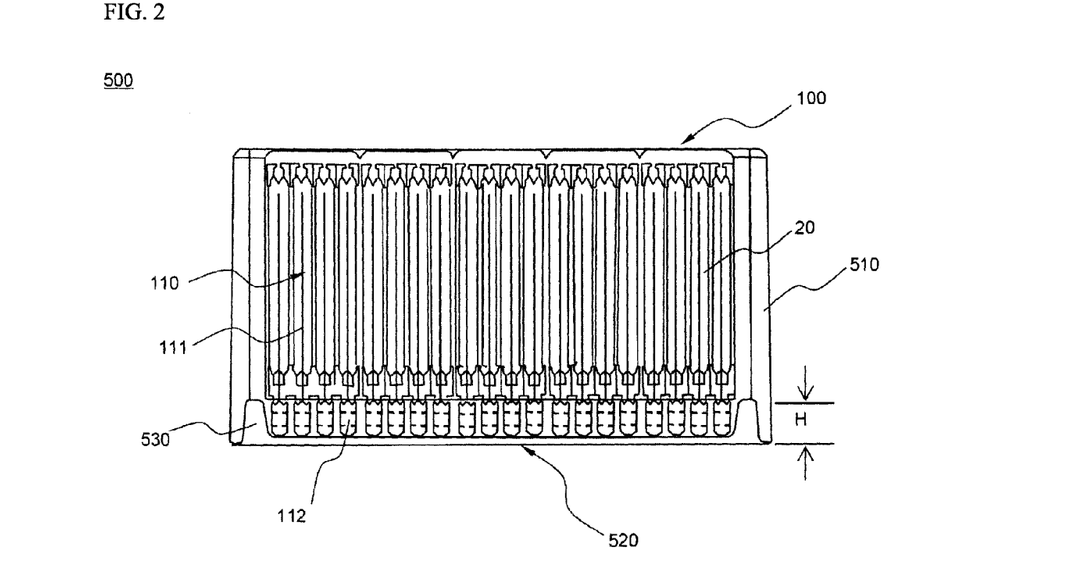
FIG. 2 is a vertical sectional view typically illustrating the middle or large-sized battery pack of FIG. 1 when viewed in a direction A.

FIG. 1 is a perspective view typically illustrating a middle or large-sized battery pack according to an embodiment of the present invention, and FIG. 2 is a vertical sectional view typically illustrating the middle or large-sized battery pack of FIG. 1 when viewed in a direction A.

Referring to these drawings, a middle or large-sized battery pack 500 includes five battery modules 100, each including four unit modules 20 which can be charged and discharged, a pack case 510 and a base plate 520 between which the five battery modules 100 are mounted, and cooling members 110 mounted at interfaces between the unit modules 20.

Each of the cooling members 110 includes a heat dissipation fin 111 disposed in contact with the outsides of corresponding ones of the unit modules 20 and a coolant conduit 112 connected to the lower end of the heat dissipation fin 111 to allow a coolant to flow therealong.

The base plate 520 is located below the battery modules 100. When viewed from the front thereof, the base plate 520 is generally formed in a U shape. The base plate 520 is provided at opposite ends thereof with upward protrusions 530.

Consequently, a coolant flow channel 540 having a coolant flow direction corresponding to the coolant flow direction in each of the coolant conduits 112 is formed in a space defined by the upper protrusions 530 of the base plate 520 and the bottoms of the respective unit modules 20.

The height H of each of the upper protrusions 530 of the base plate 520 is equal to that of each of the coolant conduits 112, and therefore, the coolant conduits 112 can be stably mounted to the base plate 520, thereby exhibiting high cooling efficiency.

Furthermore, each of the coolant conduits 112 is configured in a quadrangular hollow structure in addition to the structure in which the height H of each of the upper protrusions 530 of the base plate 520 is equal to that of each of the coolant conduits 112. Consequently, the spaces of the coolant conduits 112 are maximally utilized between the battery modules 100 disposed in contact with each other in a state in which the heat dissipation fins 111 are interposed between the respective unit modules 20, thereby maximizing the contact area between the coolant conduits 112 and the coolant.

The pack case 510 is coupled to the base plate 520 in a state in which the battery modules 100 are mounted on the base plate 520. A coolant to remove heat generated from the unit modules 20 is introduced from one side of the coolant flow channel 540 of the base plate 520 as indicated by an arrow, flows through the coolant conduits 112 of the respective cooling members 110, and is then discharged to the other side of the coolant flow channel 540 of the base plate 520.

Figure 3:
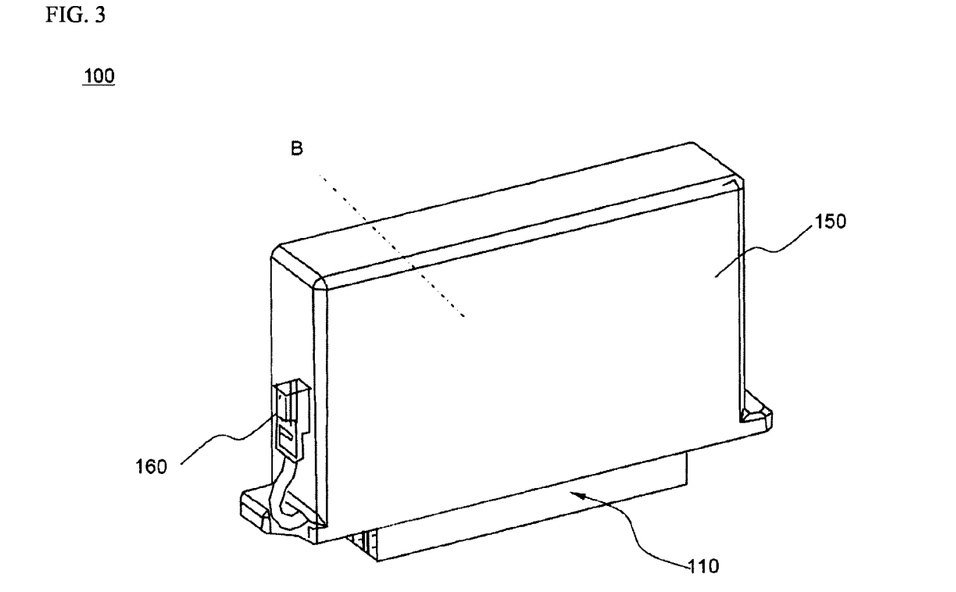
FIG. 3 is a perspective view illustrating a battery module of FIG. 1.
Figure 4:
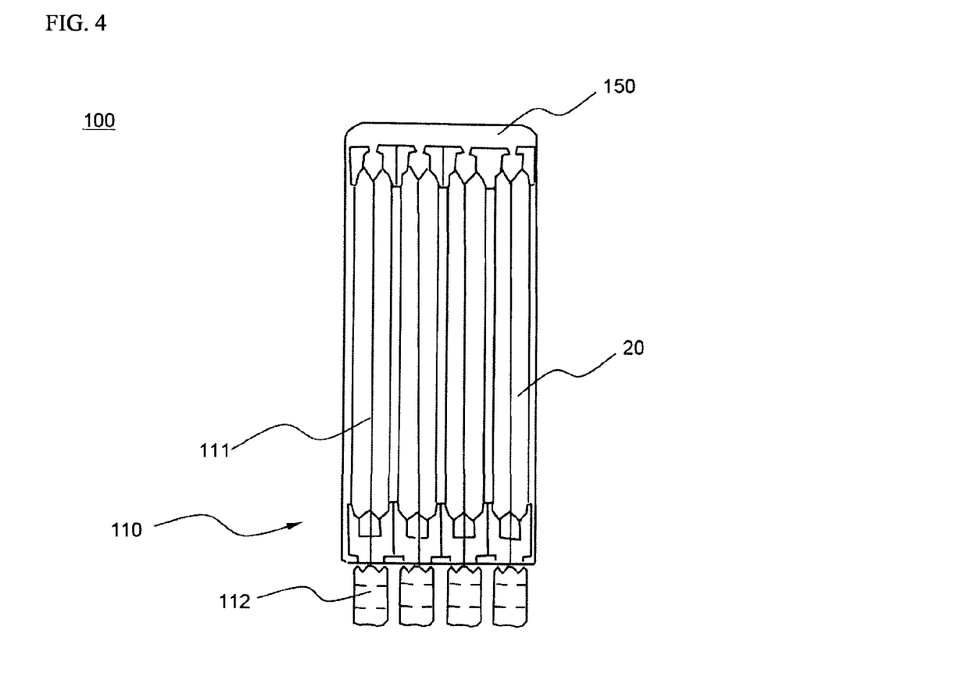
FIG. 4 is a vertical sectional view typically illustrating the battery module of FIG. 3 when viewed in a direction B.

FIG. 3 is a perspective view illustrating one of the battery modules shown in FIG. 1, and FIG. 4 is a vertical sectional view typically illustrating the battery module of FIG. 3 when viewed in a direction B.

Referring to these drawings, the battery module 100 includes a module case 150 in which four unit modules 20 are mounted so that the unit modules 20 are arranged adjacent to each other in the lateral direction, cooling members 110 disposed at interfaces between the unit modules 20, and a connector 160 mounted at the outside of the battery module 100.

Each of the cooling members 110 includes a heat dissipation fin 111 disposed in contact with the outsides of corresponding ones of the unit modules 20 and a coolant conduit 112 integrally formed at one end of the heat dissipation fin 111 to allow a coolant to flow therealong.

Also, the cooling members 110 are located at the lower part of the battery module 100, and therefore, the battery module 100 generally has a compact structure.

Figure 5:
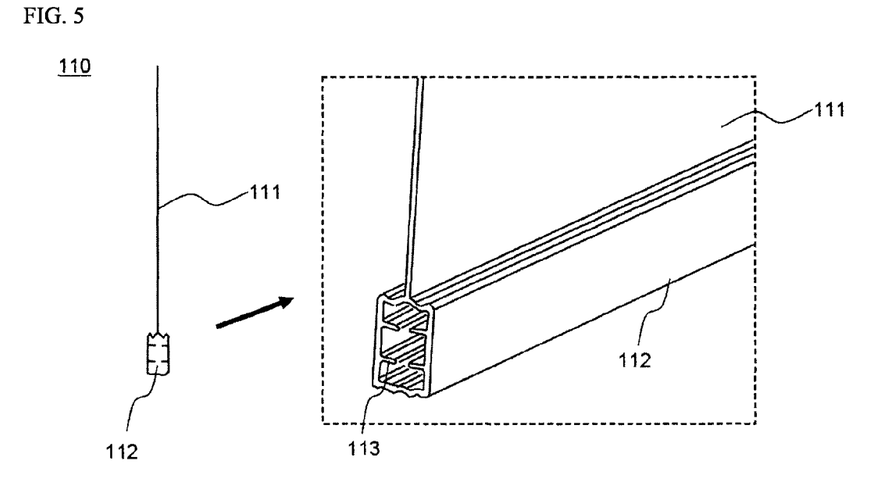
FIG. 5 is a front view illustrating a cooling member of FIG. 3 including a partially enlarged view of the cooling member.

FIG. 5 is a front view typically illustrating one of the cooling members shown in FIG. 3 including a partially enlarged view of the cooling member.

Referring to FIG. 5 together with FIG. 1, the cooling member 110 includes a plate-shaped heat dissipation fin 111, made of a metal material, and a coolant conduit 112 connected to the lower end of the heat dissipation fin 111. The coolant conduit 112 has a hollow structure.

The coolant conduit 112 is integrally formed at the heat dissipation fin 111. The coolant conduit 112 is formed by bending a plate-shaped member to have a quadrangular hollow structure in vertical section. Also, four protrusions 113 are formed at the inside of the hollow structure of the coolant conduit 112 in the flow direction of a coolant in a symmetric fashion so as to maximize the contact area between the coolant conduit 112 and the coolant. The size of each of the protrusions 113 is approximately 60% of the hollow width of the coolant conduit 112 so that the protrusions 113 do not disturb the flow of the coolant.

The coolant, flowing along the coolant conduit 112, effectively removes heat conducted to the heat dissipation fin 111 mounted at the interface between the respective unit modules 20. Consequently, the respective unit modules 20 are cooled, thereby achieving high cooling efficiency. In addition, the battery pack 500 has a compact structure while exhibiting such high cooling efficiency.

Figure 6:
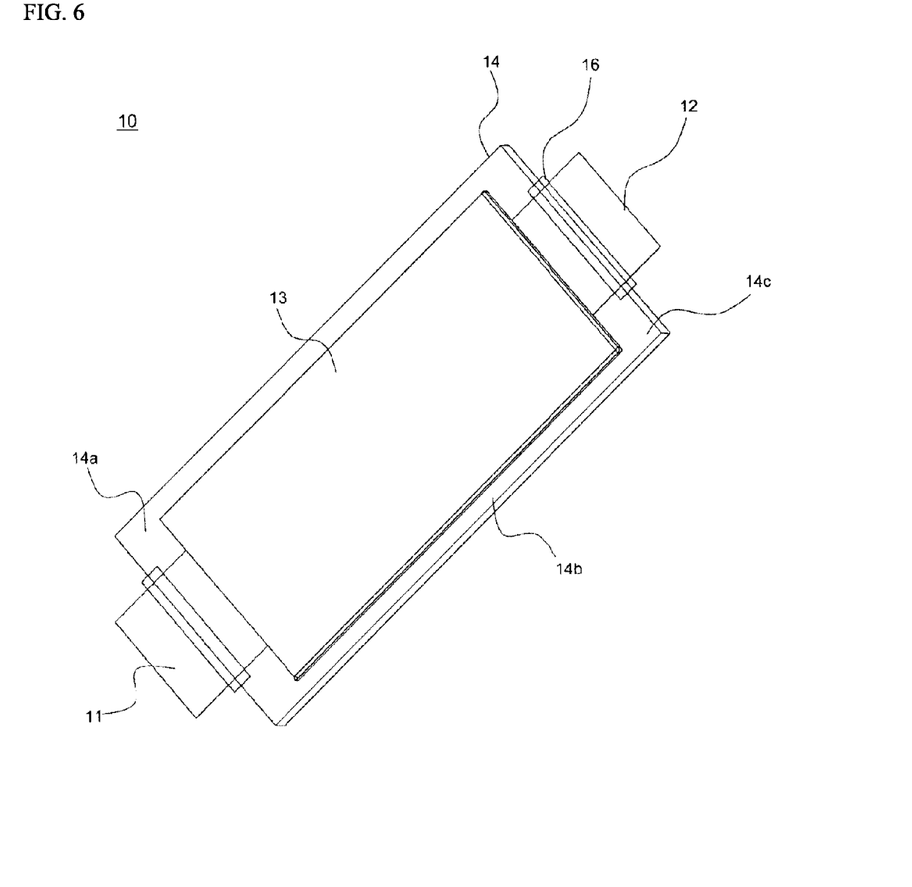
FIG. 6 is a perspective view illustrating an exemplary plate-shaped battery cell mounted in a unit module according to an embodiment of the present invention.

FIG. 6 is a perspective view typically illustrating an exemplary plate-shaped battery cell mounted in a unit module according to an embodiment of the present invention.

Referring to FIG. 6, a plate-shaped battery cell is configured to have a structure in which two electrode leads 11 and 12 protrude from the upper end and the lower end of a battery body 13 so that the electrode leads 11 and 12 are opposite to each other. A sheathing member 14 includes upper and lower sheathing parts. That is, the sheathing member 14 is a two-unit member. An electrode assembly (not shown) is received in a receiving part which is defined between the upper and lower sheathing parts of the sheathing member 14. Opposite sides 14*b* and upper and lower ends 14*a* and 14*c*, which are contact regions of the upper and lower sheathing parts of the sheathing member 14, are bonded to each other, whereby the battery cell 10 is manufactured. The sheathing member 14 is configured to have a laminate structure of a resin layer/a metal film layer/a resin layer. Consequently, it is possible to bond the opposite sides 14*b* and the upper and lower ends 14*a* and 14*c* of the upper and lower sheathing parts of the sheathing member 14, which are in contact with each other, to each other by applying heat and pressure to the opposite sides 14*b* and the upper and lower ends 14*a* and 14*c* of the upper and lower sheathing parts of the sheathing member 14 so as to weld the resin layers thereof to each other. According to circumstances, the opposite sides 14*b* and the upper and lower ends 14*a* and 14*c* of the upper and lower sheathing parts of the sheathing member 14 may be bonded to each other using a bonding agent. For the opposite sides 14b of the sheathing member 14, the same resin layers of the upper and lower sheathing parts of the sheathing member 14 are in direct contact with each other, whereby uniform sealing at the opposite sides 14b of the sheathing member 14 is accomplished by welding. For the upper end 14a and the lower end 14c of the sheathing member 14, on the other hand, the electrode leads 11 and 12 protrude from the upper end 14a and the lower end 14c of the sheathing member 14, respectively. For this reason, the upper and lower ends 14a and 14c of the upper and lower sheathing parts of the sheathing member 14 are thermally welded to each other, in a state in which a film type sealing member 16 is interposed between the electrode terminals 11 and 12 and the sheathing member 14, in consideration of the thickness of the electrode leads 11 and 12 and the difference in material between the electrode leads 11 and 12 and the sheathing member 14, so as to increase sealability of the sheathing member 14.

Figure 7:
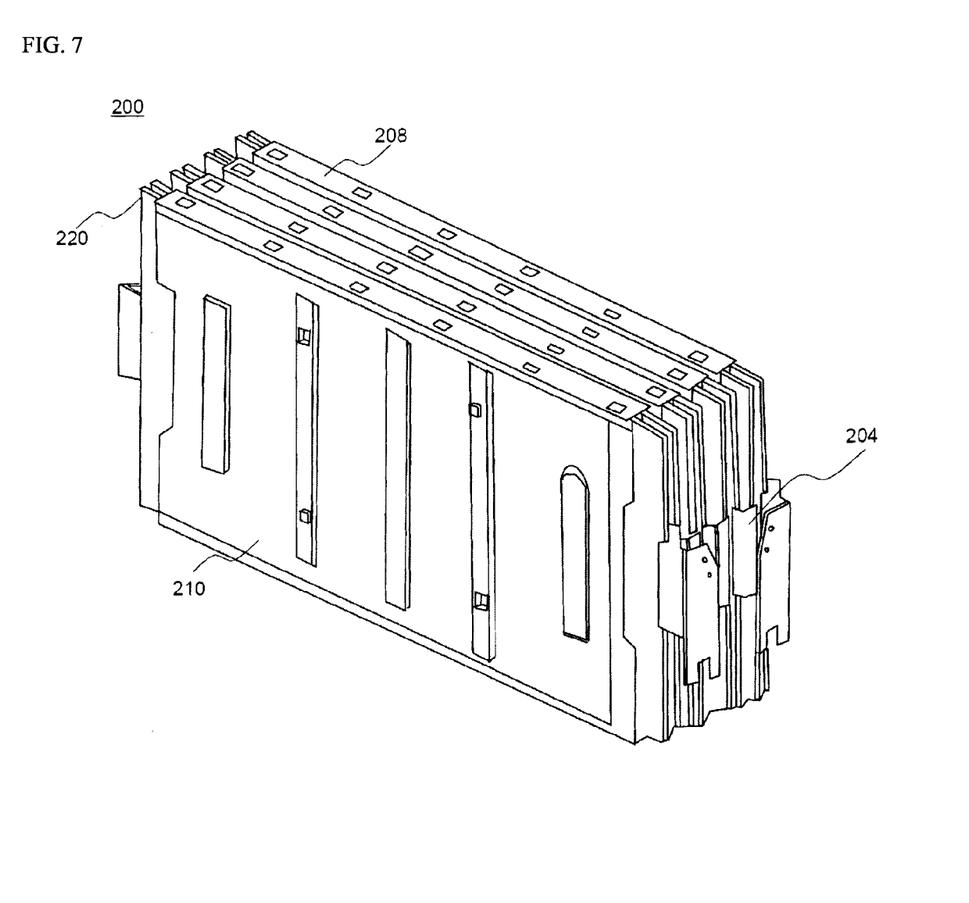
FIG. 7 is a perspective view illustrating an exemplary battery module from which cooling members are removed.

FIG. 7 is a perspective view typically illustrating an exemplary battery module from which cooling members are removed.

Referring to FIG. 7, a battery module 200 includes four unit modules 209, each of which includes two plate-shaped battery cells 220 each having electrode terminals formed at the upper end and the lower end thereof.

Each of the unit modules 208 includes two battery cells 220, electrode terminals of which are connected in series to each other, in which a connection between the electrode terminal is bent so that the battery cells are stacked, and a pair of high-strength cell covers 210 coupled to each other to cover the outside of the battery module 200 excluding the electrode terminals of the battery cells 220.

INDUSTRIAL APPLICABILITY

As is apparent from the above description, the middle or large-sized battery pack according to the present invention is configured to have a structure in which coolant conduits formed in a shape to maximize the contact area between the coolant conduits and a coolant are integrally formed at the lower parts of corresponding cooling fins, and therefore, the cooling efficiency of the battery pack is maximized.

Also, a coolant channel is located at a specific region of the middle or large-sized battery pack, and therefore, the increase in overall size of the battery pack is minimized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A middle or large-sized battery pack configured to have a structure in which two or more battery modules, each comprising a plurality of battery cells which can be charged and discharged, are mounted in a space defined between a pack case and a base plate, comprising:
cooling members, each cooling member comprising:
a heat dissipation fin formed in a plate shape and disposed in contact with outsides of corresponding ones of the battery cells; and
a coolant conduit connected to a lower end of the heat dissipation fin to allow a coolant to flow therealong, the cooling conduit configured to have a hollow structure, including one of a polygonal hollow structure, an elliptical hollow structure or a circular hollow structure in vertical section, through which the coolant flows and having two or more protrusions extending from an inner surface of the cooling conduit in a direction parallel to the flow direction of the coolant so as to maximize a contact area between the coolant conduit and the coolant;
the cooling members mounted at interfaces between the battery cells and configured to have a structure in which the coolant conduit is integrally formed in one piece with the heat dissipation fin,
wherein the base plate, located below the battery modules, is configured to form a coolant flow channel having a coolant flow direction corresponding to the coolant flow direction in the coolant conduit,
wherein the pack case is coupled to the base plate in a state in which the battery modules are mounted on the base plate, and
wherein a coolant to remove heat generated from the battery cells is introduced from one side of the coolant flow channel of the base plate, flows through the coolant conduits of the respective cooling members, and is then discharged to the other side of the coolant flow channel of the base plate.

2. The middle or large-sized battery pack according to claim 1, wherein each of the battery cells is a plate-shaped battery cell.

3. The middle or large-sized battery pack according to claim 2, wherein each of the battery cells is configured to have a structure in which an electrode assembly is mounted in a pouch-shaped battery case comprising a resin layer and a metal layer.

4. The middle or large-sized battery pack according to claim 1, further comprising unit modules comprising two or more battery cells, electrode terminals of which are connected in series to each other, and cell covers coupled to each other to cover outsides of the battery cells.

5. The middle or large-sized battery pack according to claim 1, wherein the coolant conduit of each of the cooling members is configured to have a quadrangular hollow structure through which the coolant flows.

6. The middle or large-sized battery pack according to claim 1, wherein the coolant conduit of each of the cooling members is formed by bending a plate-shaped member to have a hollow structure in vertical section, a bent end of the coolant conduit being coupled to the heat dissipation fin.

7. The middle or large-sized battery pack according to claim 1, wherein each of the cooling members is formed of a metal material exhibiting thermal conductivity.

8. The middle or large-sized battery pack according to claim 1, wherein the base plate is formed in a U shape and is provided at opposite ends thereof with upward protrusions.

9. The middle or large-sized battery pack according to claim 8, wherein each of the upper protrusions has a height equal to a height of the coolant conduit of each of the cooling members so that the coolant conduit can be stably mounted to the base plate.

10. The middle or large-sized battery pack according to claim 8, wherein the coolant flow channel is formed in a space defined by the upper protrusions of the base plate and bottoms of the battery cells.

11. The middle or large-sized battery pack according to claim 1, wherein the coolant is air.

12. The middle or large-sized battery pack according to claim 1, wherein the coolant is water.

13. The middle or large-sized battery pack according to claim 1, wherein the battery pack is used as a power source for electric vehicles, hybrid electric vehicles or plug-in hybrid electric vehicles.

14. A battery module comprising:
- a plurality of battery cells mounted in a module case so that the battery cells are arranged adjacent to each other in a lateral direction;
- a cooling member at at least one interface between the battery cells; and
- wherein the cooling member comprises:
  - a heat dissipation fin disposed in contact with outsides of corresponding ones of the battery cells;
  - a coolant conduit integrally formed in one piece with one end of the heat dissipation fin to allow a coolant to flow therealong; and
  - two or more protrusions extending from an inner surface of the cooling conduit in the flow direction of the coolant.

15. The battery module according to claim 14, wherein the coolant conduit is formed at an upper part or a lower part of the battery module.

16. The battery module according to claim 14, further comprising a connector mounted to an outside thereof.

17. A cooling member mounted at an interface between battery cells in a contact fashion, wherein
- the cooling member comprises a heat dissipation fin disposed in contact with outsides of the battery cells and a coolant conduit connected to one end of the heat dissipation fin, the coolant conduit having a hollow structure through which a coolant flows,
- the coolant conduit is configured to have a hollow structure which is a polygonal hollow structure, an elliptical hollow structure or a circular hollow structure in vertical section, through which the coolant flows, and
- the coolant conduit has two or more protrusions extending from an inner surface of the cooling conduit in the flow direction of the coolant so as to maximize a contact area between the coolant conduit and the coolant.

18. The cooling member according to claim 17, wherein the cooling conduit is connected along and extends from an edge of the heat dissipation fin.

19. The cooling member according to claim 18, wherein the cooling conduit is integrally formed in one piece with the heat dissipation fin.

* * * * *